US009286237B2

(12) United States Patent
Cai et al.

(10) Patent No.: US 9,286,237 B2
(45) Date of Patent: Mar. 15, 2016

(54) MEMORY IMBALANCE PREDICTION BASED CACHE MANAGEMENT

(71) Applicant: Intel Corporation, Santa Clara, CA (US)

(72) Inventors: Qiong Cai, Barcelona (ES); Dyer Rolan, Barcelona (ES); Blas Cuesta, Barcelona (ES); Ferad Zyulkyarov, Barcelona (ES); Serkan Ozdemir, Barcelona (ES); Marios Nicolaides, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 13/793,674

(22) Filed: Mar. 11, 2013

(65) Prior Publication Data

US 2014/0258605 A1    Sep. 11, 2014

(51) Int. Cl.
*G06F 12/00*   (2006.01)
*G06F 12/12*   (2006.01)

(52) U.S. Cl.
CPC .............. *G06F 12/12* (2013.01); *G06F 12/122* (2013.01); *G06F 2212/69* (2013.01); *G06F 2212/7211* (2013.01)

(58) Field of Classification Search
CPC ... G06F 12/12; G06F 12/122; G06F 2212/69; G06F 2212/7211
See application file for complete search history.

(56) References Cited

U.S. PATENT DOCUMENTS

| 6,378,042 | B1 * | 4/2002 | Henderson et al. ........... 711/128 |
| 2002/0138559 | A1 * | 9/2002 | Ulrich et al. .................. 709/203 |
| 2005/0240745 | A1 * | 10/2005 | Iyer et al. ...................... 711/167 |
| 2007/0016726 | A1 * | 1/2007 | Zohar et al. .................... 711/114 |

* cited by examiner

*Primary Examiner* — Aracelis Ruiz
(74) *Attorney, Agent, or Firm* — Schwabe, Williamson & Wyatt, P.C.

(57) ABSTRACT

Embodiments of methods, apparatuses, and storage media for memory imbalance prediction-based cache memory management are disclosed herein. In one instance, the apparatus may include a memory controller associated with a memory having a plurality of storage units. The memory controller may include logic configured to determine whether the memory enters into an imbalance state based at least in part on a difference in numbers of pending access requests to different storage units, and cause an adjustment of replacement management of a cache memory, based at least in part on a result of the determination. Other embodiments may be described and/or claimed.

25 Claims, 5 Drawing Sheets

MEMORY IMBALANCE PREDICTION BASED CACHE MANAGEMENT

FIELD

Embodiments of the present disclosure generally relate to the field of memory, and more particularly, to techniques for cache management.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Nowadays, computer memory systems may not achieve peak performance for applications attempting to access the memory, partly due to access request conflicts occurring while attempting to access different memory areas (e.g., storage units comprising the memory, also known as banks or partitions). Memory management techniques aimed at resolving memory access request conflicts may involve designing memory address mapping so that memory access requests may be somewhat evenly distributed into different storage units. However, such techniques may not always be successful in attempting to avoid access request conflicts because address mapping may typically be determined statically at design time and accordingly may not take into account dynamic workload changes that may trigger multiple access requests to one or more storage units at a given time, which may cause memory access conflicts and delays in servicing memory access requests.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Apparatuses, methods and storage medium associated with memory imbalance prediction and cache management are disclosed herein. Techniques described herein may involve determining memory imbalance for a current memory cycle (e.g., current time interval), based on uneven distribution of memory requests to different storage units of the memory. Based in part on the determination of the current memory imbalance, a memory imbalance for a next memory cycle (e.g., next time interval) may be predicted. The storage units "responsible" for the predicted imbalance ("critical storage units") may be identified and information about the critical storage unit may be provided to a cache memory controller configured to manage cache memory associated with the memory, to adjust cached data replacement policy in accordance with the provided information.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Various entities may be introduced and described with respect to the operations they perform. It will be understood that these entities may include hardware, software, and/or firmware elements that are cooperatively configured to provide the described operations.

Figure 1:
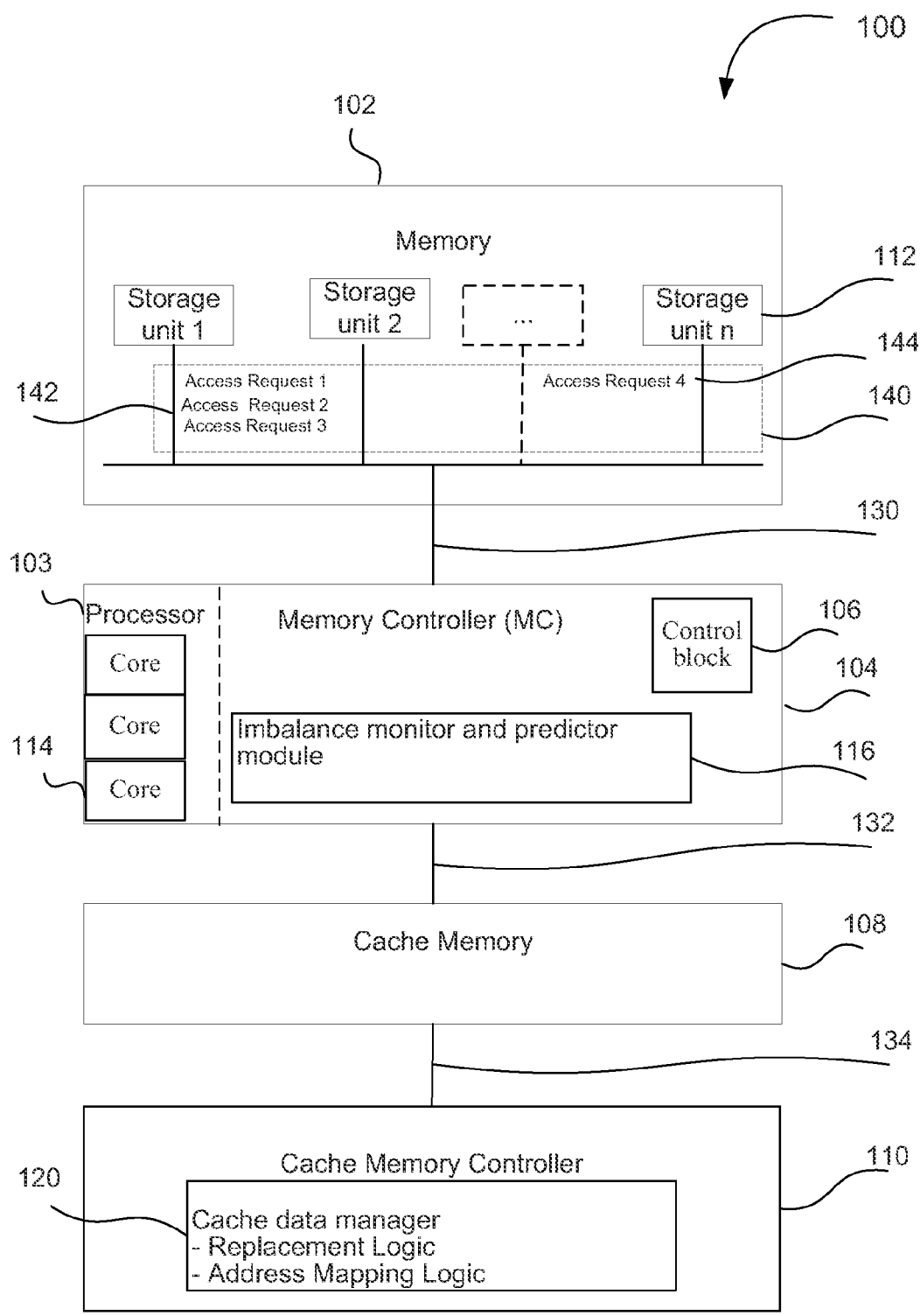
FIG. 1 illustrates an example environment (e.g., computing system) in which memory imbalance prediction based cache management may be implemented in accordance with various embodiments.

FIG. 1 illustrates an example environment (e.g., computing system 100) in which memory imbalance based cache management may be implemented in accordance with various embodiments. In embodiments, computer system 100 may include processor 103 and a hierarchical memory arrangement. In embodiments, the hierarchical memory arrangement may include a two-level memory arrangement, including a "near" memory such as cache memory 108, accessed through cache memory controller 110, and "far" memory such as memory 102 accessed through memory controller 104. In embodiments, memory 102 may be volatile (e.g., dynamic random-access memory (DRAM)) or non-volatile memory (e.g., phase-change memory). The two-level memory arrangements may be implemented in any one of a number architectures including, but are not limited to: static random access memory (SRAM)-based last level cache and DRAM-based main memory; embedded DRAM (eDRAM)-based cache and DRAM-based main memory; or wide input-output (WI/O) DRAM or eDRAM-based near memory cache and non-volatile main memory such as three dimensional (3D) cross point memory (e.g., phase change memory (PCM)). For ease of understanding, the last level cache or near memory cache will be hereinafter simply referred to as "cache memory."

Memory 102 may include one or more storage units 112, such as banks (volatile memory) or partitions (non-volatile memory). In embodiments, cache memory 108, and cache memory controller 110 may be coupled with each other via interfaces 130, 132, 134 as shown. In other embodiments, e.g., in an eDRAM implementation, cache memory 108 and cache memory controller 110 may be included in the MC 104. The processor 103 may include one or more processing units (e.g., cores) 114. In various embodiments, the MC 104 may include a control block 106 configured to manage access requests to memory 102, for example, process access requests 140 to the memory 102 from computing system 100 components, such as, for example, core 114. The MC 104 may also include an imbalance monitor and predictor module 116 configured to perform memory imbalance monitoring and prediction of memory access imbalance among the storage units 112, as described below in greater detail. Imbalance monitor and predictor module 116 and control block 106 may be implemented with any combination of hardware and software. The configuration shown in FIG. 1 is just one non-limiting example. In other embodiments, imbalance monitor and predictor module 116 and control block 106 may be separate from memory controller 104.

Examples of non-volatile memory may include but not limited to NAND (flash) memory, ferroelectric random-access memory (FeTRAM), nanowire-based non-volatile memory, memory that incorporates memristor technology, a static random access memory (SRAM), three dimensional (3D) cross point memory such as phase change memory (PCM), spin-transfer torque memory (STT-RAM), and the like.

In embodiments, MC 104, more specifically, imbalance monitor and predictor module 116 may be configured to determine memory access imbalance for a current memory cycle (e.g., current time interval), based on uneven distribution of memory requests 140 to different storage units 112 of memory 102. For example, a number of access requests 142 to "storage unit 1" may be higher than a number of access requests 144 to "storage unit 4," e.g., in excess of a particular threshold. Based at least in part on the determination of the current memory imbalance, imbalance monitor and predictor module 116 may be configured to predict memory imbalance for the next memory cycle (e.g., next time interval). Imbalance monitor and predictor module 116 may be further configured to identify critical storage units among the storage units 112. For example, the critical storage units may be the storage units having a number of associated memory access requests that is above a certain threshold. In another example, the critical storage units may be the storage units having more associated memory access requests than other storage units in excess of a difference threshold. MC 104 may provide information about identified critical storage units to the cache memory controller 110 operating cache memory 108.

Cache memory 108 may be configured to temporarily store data that may be requested from different storage units 112 of memory 102 or written into storage units 112 of memory 102. For example, cache memory 108 may include data pertaining to different storage units 112 of memory 102. Cache memory 108 may have smaller storing capacity than memory 102. In operation, when a memory access request is received for data stored in a particular storage unit 112, cache memory controller 110 may determine whether the requested data is already stored in cache memory 108 and if so, provide the requested data from cache memory 108 without having to forward the memory access request to memory 102.

Because of a small size of a cache memory (e.g., relative to a main memory size), when new data is written into cache memory 108, the "old" data (e.g., least used data) may be evicted from cache memory 108 in order to provide storage space for, and replace it with, new data. Cache memory controller 110, more specifically, cache data manager 120 included in cache memory controller 110 may be configured to manage cached data replacement according to different methods or algorithms, known as "cached data replacement policy" and implemented as replacement logic associated with cache data manager 120.

Knowing the identities of the critical storage units, cache memory controller 110 may adjust the cached data replacement policy to keep the data pertaining to the identified critical storage units for at least a time interval for which the memory imbalance has been predicted. Accordingly, memory imbalance for a next time interval may be reduced by serving the memory access requests to the critical memory units with data held in cache memory 108. Techniques for memory imbalance detection and prediction, critical storage unit identification, and corresponding cache data replacement policy adjustments will be described in greater detail in reference to FIGS. 2-4.

Figure 2:
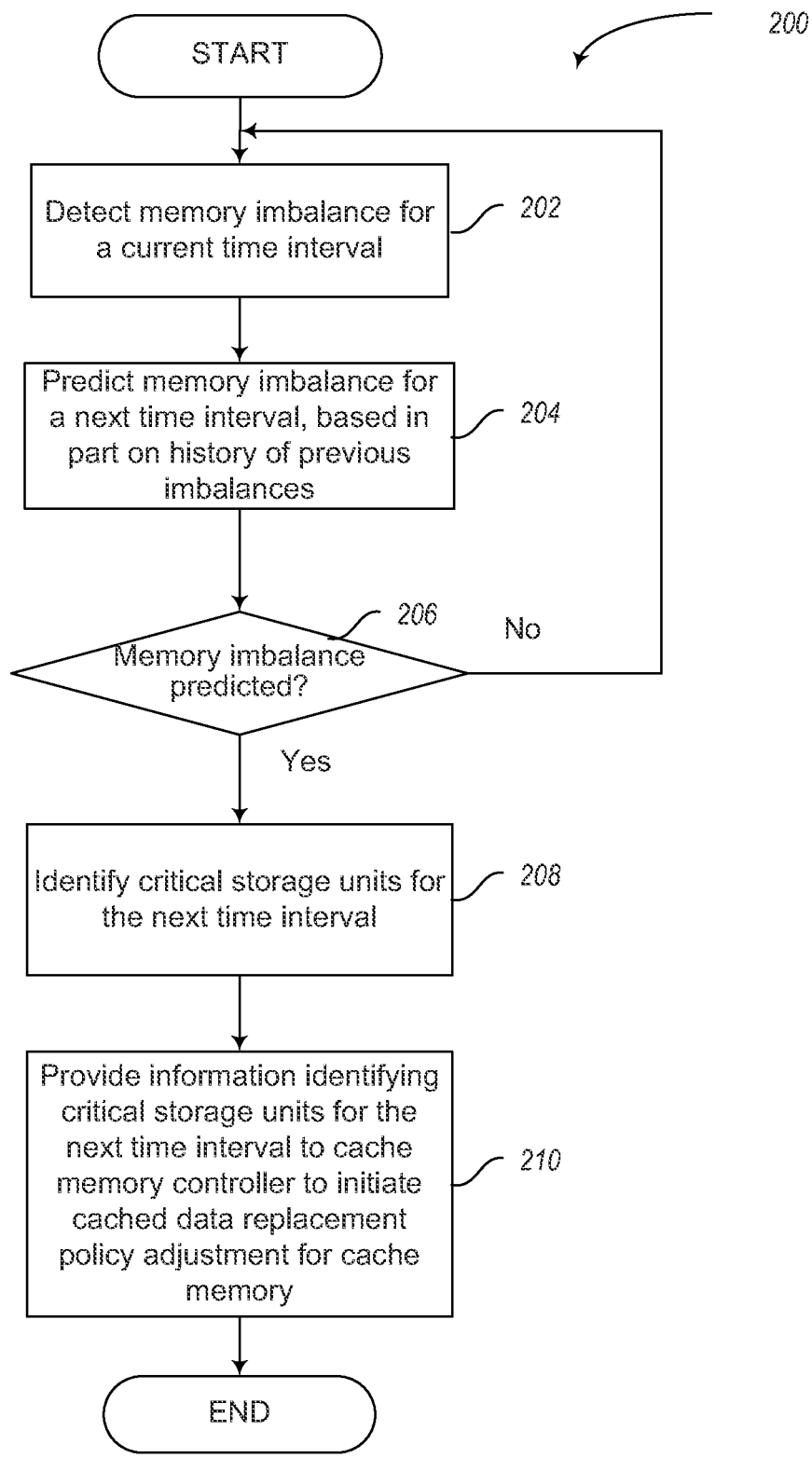
FIG. 2 illustrates an example process flow diagram for predicting memory imbalance in accordance with various embodiments.

FIG. 2 is a process flow diagram illustrating some aspects for predicting memory imbalance and identifying critical storage units by MC 104 in accordance with various embodiments.

The process 200 may begin at block 202, where MC 104 may detect memory imbalance for a current memory cycle, e.g., a current time interval. Memory imbalance may involve workload imbalance among a number of storage units 112 of memory 102. As described above, distribution of memory access requests 140 to different storage units 112 may be uneven. For example, as illustrated in FIG. 1, "storage unit 1" may have four pending access requests 142, while "storage unit 4" may have one pending request 144. Based on detecting an uneven distribution of memory access requests, MC 104 may detect memory imbalance for the current memory cycle (e.g., time interval).

There are different ways to implement a detection of memory imbalance. For example, memory imbalance may be characterized by a numerical value called memory imbalance numerical (IN) and defined by the following formula:

$$IN[t] = VAR\{w[i][t] : i=1, \ldots, N\},$$

where $w[i][t]$ represents the number of pending access requests for a given storage unit i during a time interval t, N is the number of storage units, and VAR is the variance function. Another way to define the memory imbalance numerical may be to compute the memory imbalance numerical as a difference between maximum and minimum of $w[i][t]$. Based on the above definition of the memory imbalance numerical, memory imbalance Boolean (IB) may be defined as follows:

$$IB[t] = (IN[t] >= T\_imbalance),$$

where T_imbalance is a threshold to decide whether the memory is imbalanced. For example, if IB is true, then the system may be considered imbalanced; otherwise, the system may be considered balanced. In general, a sequence of IN[t1], IN[t2] . . . , may be computed for each memory cycle (e.g., time interval) t1, t2, . . . in a sequence of time intervals.

With continued reference to FIG. 2, at block 204, the MC 104 may predict memory imbalance for a next memory cycle (time interval). In embodiments, prediction of memory imbalance based on a distribution of access requests to storage units may be computed using a variable called "next imbalance predictor" (NIP), which may indicate whether the storage unit usage may be imbalanced for the next time interval. NIP may be defined in a number of different ways. For example, a simple moving average (SMA) mechanism may be used to define NIP:

$$IN'[t\_\{i+1\}]=(IN[t\_\{i-n+1\}]+\ldots+IN[t\_i])/n,$$

where n is the number of previous imbalance values. The memory imbalance Boolean $IB'[t\_\{i+1\}]$ may be obtained based on the predicted value of $IN'[t\_\{i+1\}]$.

Based on the memory imbalance prediction technique described above, at decision block 206, the MC 104 may determine whether memory imbalance for the next time interval is predicted to occur. If no imbalance is predicted to occur, the process 200 may return to block 202. If memory imbalance is predicted to occur, at block 208, the MC 104 may identify critical storage units for the next time interval. The critical storage units may be identified in a number of different ways. In embodiments, a variable, critical storage unit predictor (CUP) may identify a set of predicted critical storage units (PCU) for the next time interval. For example, if $IB'[t\_\{i+1\}]$ is determined to be true, then CUP may predict that the most congested storage unit of the current interval (e.g., "storage unit 1" in FIG. 1) is the critical storage unit for the next interval:

$$PCU[t\_\{i+1\}]=\{p|\max\{w[p][t]:p=1,\ldots,N\}\} \text{ when } IB'[t\_\{i+1\}]=\text{true}$$

The critical storage unit may be defined in a number of different ways: for example, the storage unit may have a number of pending access requests in excess of a threshold or in excess of a difference threshold compared to other storage units, or simply may have a highest number of pending access requests compared to other storage units. Accordingly, while the current example critical storage unit identification technique provides one storage unit as PCU, the technique may be generalized to identify more than one critical storage units. It is important to note that the memory imbalance prediction and critical storage unit identification techniques described above are but an example of the memory imbalance prediction and storage unit identification and are not limiting on the current disclosure. Different prediction and identification techniques may be used in accordance with the spirit of the current disclosure.

Figure 3:
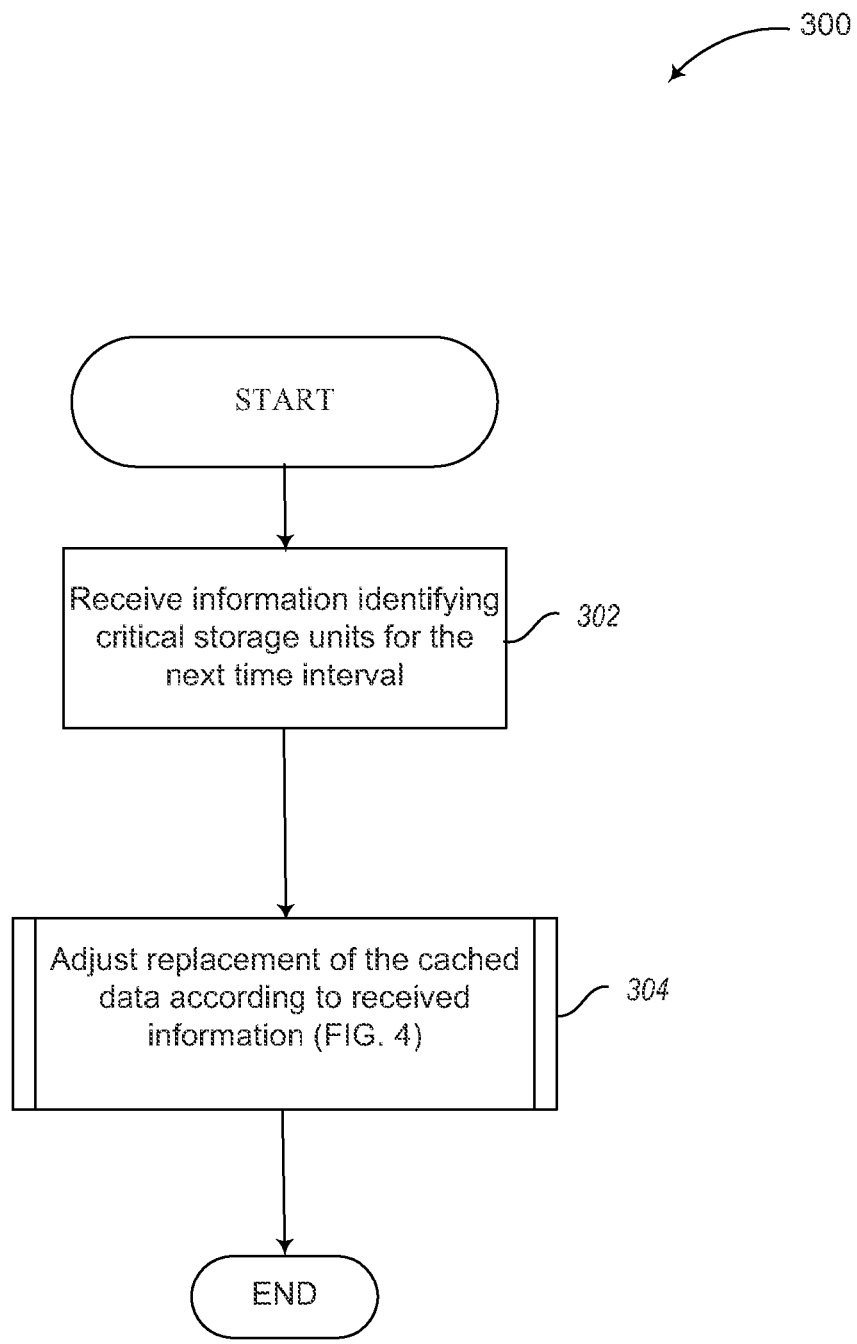
FIG. 3 illustrates an example process flow diagram for managing cache memory in accordance with predicted memory imbalance, in accordance with various embodiments.
Figure 4:
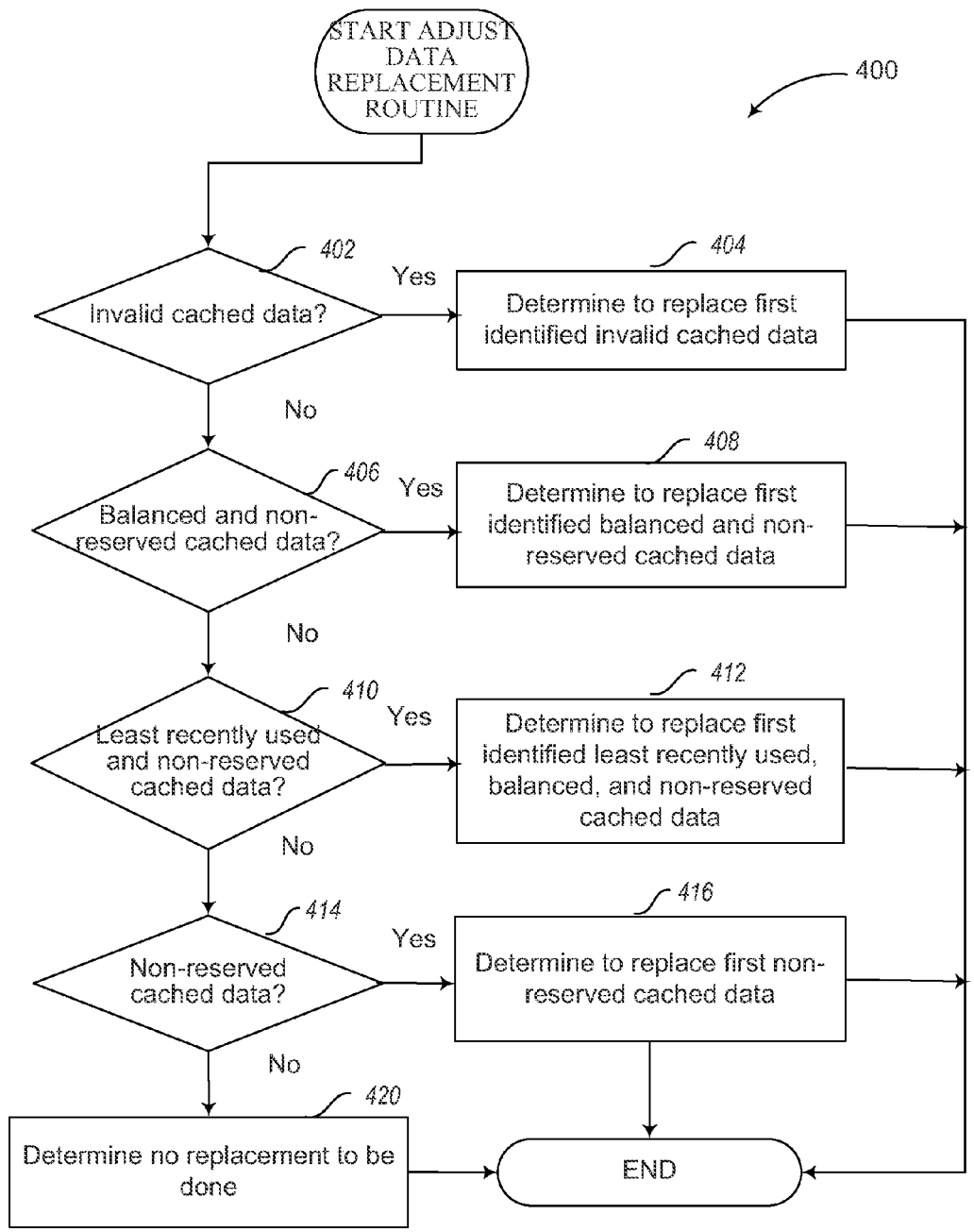
FIG. 4 illustrates an example process flow diagram for cache replacement policy adjustment in accordance with various embodiments.

When the critical storage unit or units have been identified, at block 210, the MC 104 may provide information identifying critical storage units to cache memory controller 110 in order to initiate cached data replacement policy adjustment as described in reference to FIGS. 3 and 4.

In general, the prediction technique described above may be employed every time interval t_i. If PCU is empty (no storage units are marked as critical), the memory may be considered balanced; otherwise the memory may be considered imbalanced. Every t_i time interval, a signal containing information about PCU may be provided MC 104 to the cache memory controller 110.

FIG. 3 is a process flow diagram illustrating some aspects of the cache memory controller 110 managing cache memory 108 in accordance with various embodiments.

The process 300 may begin at block 302, where cache memory controller 110, or more specifically, cache data manager 120, may receive from MC 104 information identifying critical storage units as described in reference to block 210 of FIG. 2. At block 304, cache memory controller 110 may begin an adjustment of the cached data replacement policy according to the received information. The adjustment of cached data replacement policy of block 304 is described in greater detail in reference to FIG. 4. In order to adjust the cached data replacement policy, cache memory controller 110 (e.g., cache data manager 120) may include, in addition to replacement logic, an address mapping logic configured to map memory access requests to storage units, e.g., critical storage units.

The address mapping logic may be configured to translate a physical memory address to a storage unit address. The replacement logic in cache data manager 120 may require the storage unit address for each memory access request. It may be possible to have the storage unit address available to cache memory controller 110 in different ways. For example, address mapping logic may be implemented in cache data manager 120 to decode the storage unit address. In another example, address mapping logic may be shared between MC 104 and cache memory controller 110.

FIG. 4 is a process flow diagram illustrating some aspects of cached data replacement policy adjustment in accordance with various embodiments. In embodiments, the process 400 may be performed by cache memory controller 110.

In embodiments, cache memory controller 110 may maintain one or more state bits called "memory imbalance bits," e.g., one bit for each memory channel. A memory channel may include one (or more) ranks, such as memory modules (e.g., DRAMs) that may comprise a storage unit 112, such as a bank. The memory imbalanced bits may be stored in a dedicated structure (e.g., implemented as a hardware register or software component) in cache memory controller 110. In one example, by default, the memory imbalance bit may be set to "false", for example logical "0". Every t_i time interval, cache memory controller 110 may check the imbalance information from MC 104 as described in reference to FIG. 3. If PCU received is not empty, then the corresponding bit may be set to "true"; otherwise that bit may be set to "false".

In embodiments, the cached data replacement policy may be by default a "least recently used" (LRU) policy, according to which cache memory controller 110 may discard the least recently used data (e.g., portions of data) first. A default cached data replacement policy may not be limited to LRU; other data replacement mechanisms may be used, for example, "most recently used" (MRU), pseudo-LRU, random replacement (RR), segmented LRU (SLRU) and the like. The use of LRU as a default cached data replacement policy is discussed herein by way of example and is no way limiting to the current disclosure.

As discussed above, default cached data replacement policy may be adjusted in accordance with information regarding critical storage unit provided by MC 104, as discussed above. An indicator triggering the adjustment may be receiving non-empty PCU and corresponding setting a memory imbalance bit to "true" as discussed above. For example, in an N-way associative cache memory, the adjustment of the cached data replacement policy may be as set forth below in a form of the pseudo-code. As shown in the pseudo code below, a way in an n-way (e.g., 2 way) set associative cache may be considered "reserved" if there are pending controller operations associated with the way. A way may be considered "balanced" if the memory access request corresponding to this way is not mapped to any critical storage unit. In other words, the memory access request may be mapped to a storage unit of the memory in a balanced state (e.g., when the memory was in the balanced state in one of previous memory cycles).

IF (invalid way exists)
Return the first invalid way found;
ELSE IF (balanced and non-reserved way exists)
Return the first balanced and non-reserved way;

ELSE IF (LRU and non-reserved way exists)
Return the first LRU and non-reserved way;
ELSE IF (non-reserved way exists)
Return the first non-reserved way;
ELSE
Return EVICTION-FAILED.

The process 400 illustrates an implementation of the adjustment of the cached data replacement policy as described in the pseudo-code above. The process may begin at decision block 402, where the cache memory controller 110 may determine whether there is any data stored in the cache memory 108 that may be invalid. If invalid cached data is found, the cache memory controller 110 at block 404 may determine to replace (e.g., evict) a first identified invalid cached data (e.g., cached data entry) stored in the cache memory 108. If no invalid cached data is found, the cache memory controller 110 may determine, at decision block 406, whether there is any not imbalanced and non-reserved cached data. If such not imbalanced and non-reserved data is determined to exist, cache memory controller 110 at block 408 may determine to replace (evict) a first identified not imbalanced and non-reserved cached data entry. For ease of understanding, not imbalanced storage unit may hereinafter referred to as "balanced" storage unit. In embodiments, the threshold used to characterize storage units as balanced or imbalanced may be application dependent, and/or configurable.

If balanced and non-reserved cached data does not exist, cache memory controller 110 at decision block 410 may determine whether there is any least recently used and non-reserved cached data. If such data is determined to exist, cache memory controller 110 at block 412 may determine to replace (evict) a first identified least recently used and non-reserved cached data entry.

If least recently used, balanced, and non-reserved cached data does not exist, cache memory controller 110 at decision block 414 may determine whether there is any non-reserved cached data. If such data is determined to exist, cache memory controller 110 at block 416 may determine to replace (evict) a first identified non-reserved cached data entry. Otherwise, cache memory controller at block 420 may determine that no data eviction (replacement) may be done for the current memory cycle, and return an exception message, such as eviction failure.

In summary, the described above cached data replacement policy may be configured to delay the replacement (eviction) of the cached data corresponding to memory access requests mapped to critical storage units by giving a priority for replacement (eviction) to cached data associated with a memory in a balanced state. As a result, the replacement policy, as adjusted, may improve the memory utilization.

Figure 5:
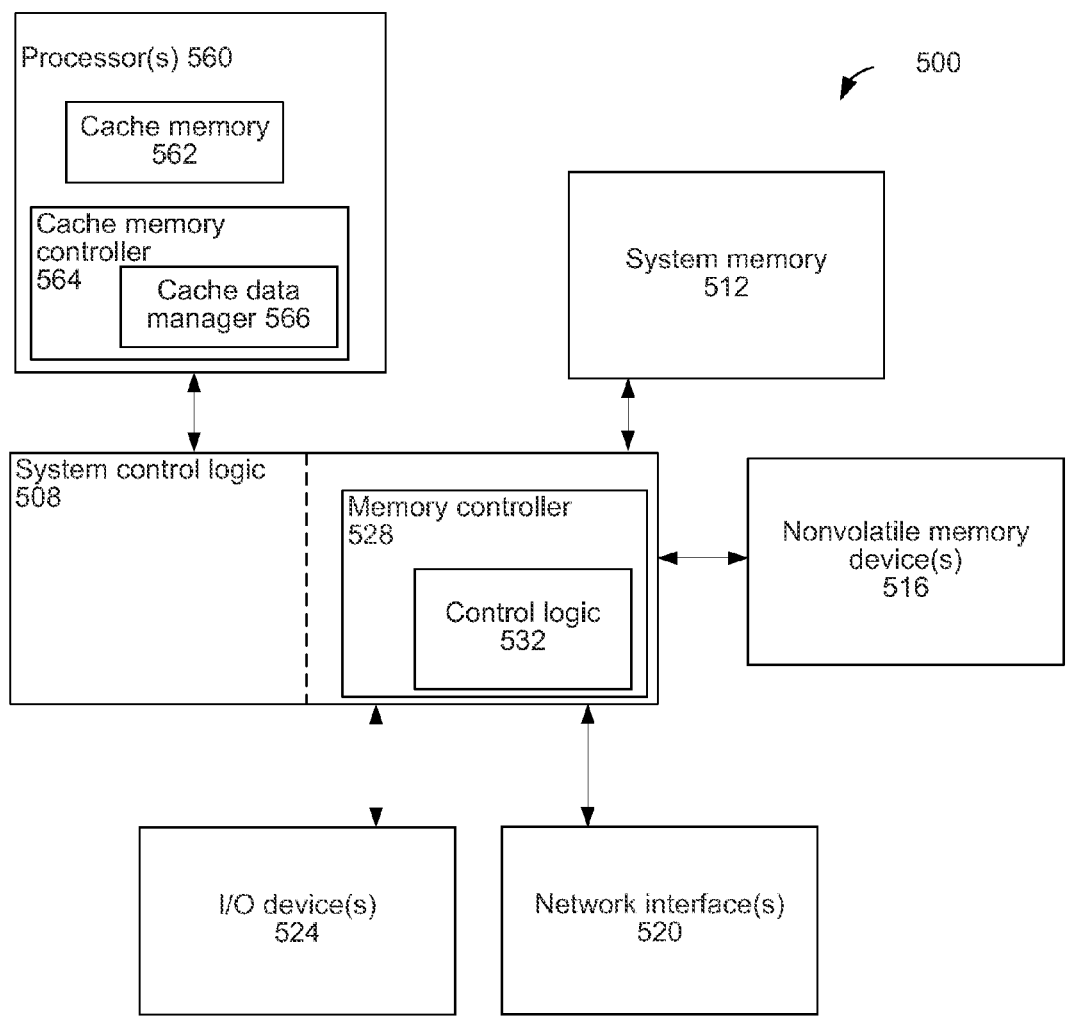
FIG. 5 illustrates a system configured with memory imbalance prediction and cache replacement policy adjustment in accordance with some embodiments.

FIG. 5 illustrates an example system 500 suitable for implementing aspects of memory imbalance based cache management described herein in accordance with various embodiments. Embodiments of the present disclosure may be implemented into a system using any suitable hardware and/or software to configure as desired. An example system 500 comprises processor(s) 560, system control logic 508 coupled to, or integrated with, at least one of the processor(s) 560, system memory 512 coupled to system control logic 508, non-volatile memory device(s) 516 coupled to system control logic 508, network interface(s) 520 coupled to system control logic 508, and input/output device(s) 524 coupled to system control logic 508.

The processor(s) 560 may include one or more single-core or multi-core processors. The processor(s) 560 may include any combination of general-purpose processors and dedicated processors (e.g., graphics processors, application processors, etc.). Applications, operating systems, etc., executing on the processor(s) 560 may issue memory access requests directed to the system memory 512 and/or nonvolatile memory device(s) 516 similar to the memory access requests issued to memory 102 described above with respect to FIG. 1.

In embodiments, processor(s) 560 may include the components similar to those described in reference to cache memory controller 108, for example, cache data manager 120 configured to perform an adjustment of cached data replacement policy described earlier. More specifically, one of the processor(s) 560 may include cache memory 562 coupled with cache memory controller 564 that may include cache data manager 566 configured to perform cached data replacement policy adjustments as discussed above. In some embodiments, processor(s) 560 may include or otherwise be configured to access cache memory 562, which may be configured to be separate from, but associated with, processor 560. In some embodiments, processor(s) 560 may be configured to execute instructions to perform functions described below in regard to system control logic 508.

System control logic 508 for one embodiment may include any suitable interface controllers to provide for any suitable interface to at least one of the processor(s) 560 and/or to any suitable device or component in communication with system control logic 508.

System control logic 508 for one embodiment may include one or more memory controller(s), e.g., memory controller 528, to provide an interface to system memory 512 and non-volatile memory device(s) 516. System memory 512 may be used to load and store data and/or instructions, for example, for system 500. System memory 512 for one embodiment may include any suitable volatile memory, such as suitable dynamic random access memory (DRAM), for example.

The non-volatile memory device(s) 516 may include one or more tangible, non-transitory computer-readable media used to store data and/or instructions, for example. The non-volatile memory device(s) 516 may include non-volatile memory that may be implemented in, for example, a solid state drive (SSD). The non-volatile memory device(s) 516 may further include any suitable non-volatile storage device(s), such as one or more hard disk drive(s) (HDD(s)), compact disk (CD) drive(s), and/or digital versatile disk (DVD) drive(s), for example. In embodiments, the non-volatile memory device(s) 516 may include components similar to those described in reference to FIG. 1, such as, for example, memory 102.

The memory controller 528 may include control logic 532 configured to perform at least some parts of the memory imbalance prediction and critical storage units identification described herein. The control logic 532 may include instructions that may be executable by one or more processors (not shown) embedded with memory controller 528 to perform the described operations. In embodiments, control logic 532 may include a control block and an imbalance monitor and predictor module similar to elements 106 and 116 described in reference to FIG. 1.

System control logic 508 for one embodiment may include one or more input/output (I/O) controller(s) to provide an interface to network interface(s) 520 and I/O device(s) 524.

Network interface(s) 520 may provide one or more interface(s) for system 500 to communicate over one or more network(s) and/or with any other suitable device. Network interface(s) 520 may include any suitable hardware and/or firmware. Network interface(s) 520 for one embodiment may include, for example, a network adapter, a wireless network adapter, a telephone modem, and/or a wireless modem. For wireless communications, network interface(s) 520 may use one or more antennas. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The network interface(s) 520 may implement any of a number of wireless standards or protocols, including but not limited to Wi-Fi (IEEE 802.11 family), Worldwide Interoperability for Microwave Access (WiMAX, IEEE 802.16 family), IEEE 802.20, long term evolution (LTE), Evolution Data Optimized (Ev-DO), Evolved High-Speed Packet Access (HSPA+), Evolved High-Speed Downlink Packet Access (HSDPA+), Evolved High-Speed Uplink Packet Access (HSUPA+), Enhanced Data rates for GSM Evolution (EDGE), Global System for Mobile Communications (GSM), General Packet Radio Service (GPRS), Code Division Multiple Access (CDMA), Time Division Multiple Access (TDMA), Digital Enhanced Cordless Telecommunications (DECT), Bluetooth®, and derivatives thereof, as well as any other wireless protocols that are designated as 2G, 3G, 4G, 5G, and beyond.

The system 500 may include a plurality of communication chips (not illustrated) for implementing various aspects of network interfacing. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

The system 500 may include a display device, such as, for example, a cathode ray tube (CRT), a liquid crystal display (LCD), a light emitting diode (LED), or other suitable display device. The display device may be a touch screen display supporting touch screen features, and in various one of these embodiments, the I/O controller may include a touchscreen controller. In various embodiments, the display device may be a peripheral device interconnected with the system 500.

For one embodiment, memory controller 528 may be packaged together with logic of system control logic 508. For one embodiment, memory controller 528 may be packaged together with logic of system control logic 508 to form a System in Package (SiP). For one embodiment, memory controller 528 may be integrated on the same die with logic for system control logic 508. For one embodiment, memory controller 528 may be integrated on the same die with logic, e.g., control logic 532, and processor 560 to form a System on Chip (SoC) package.

The I/O device(s) 524 may include user interfaces designed to enable user interaction with the system 500, peripheral component interfaces designed to enable peripheral component interaction with the system 500, and/or sensors designed to determine environmental conditions and/or location information related to the system 500. In various embodiments, the user interfaces could include, but are not limited to, a display, e.g., a liquid crystal display, a touch screen display, etc., a speaker, a microphone, a still camera, a video camera, a flashlight (e.g., a light emitting diode flash), and a keyboard. For embodiments including a display supporting touch screen features, the system 500 may include a touchscreen controller for facilitating control of the display. In various embodiments, the peripheral component interfaces may include, but are not limited to, a nonvolatile memory port, an audio jack, and a power supply interface. In various embodiments, the sensors may include, but are not limited to, a gyro sensor, an accelerometer, a proximity sensor, an ambient light sensor, and a positioning unit. The positioning unit may also be part of, or interact with, the network interface(s) 520 to communicate with components of a positioning network, e.g., a global positioning system (GPS) satellite.

In various embodiments, the system 500 may be any other electronic device that processes data. In various embodiments, the system 500 may be a computing device such as, but not limited to, a laptop computing device, a tablet computing device, a netbook, a desktop computing device, a smartphone, a mobile phone, a personal digital assistant, an ultra-mobile personal computing device, a server, a printer, a scanner, a monitor, a set-top box, an entertainment control unit, a digital camera, a portable music player, a digital video recorder, etc. In various embodiments, system 500 may have more or fewer components, and/or different architectures.

According to various embodiments, the present disclosure describes a number of examples. Example 1 is an apparatus for memory management comprising a memory controller associated with a memory having a plurality of storage units, and including logic configured to determine whether the memory enters into an imbalance state based at least in part on a difference in numbers of pending access requests to different storage units, and cause an adjustment of replacement management of a cache memory, based at least in part on a result of the determine.

Example 2 may include the subject matter of Example 1, and further specifies that the logic is configured to detect, for a current time interval, a current memory imbalance state, based at least in part on a difference between a number of pending access requests to one or more storage units and a number of pending access requests to remaining storage units during the current time interval; and identify, for a next time interval, one or more critical storage units, each critical storage unit having an associated number of pending access requests during the current time interval such that the distribution of the associated pending access request caused, at least in part, the detection of the current memory imbalance state.

Example 3 may include the subject matter of Example 2, and further specifies that the current and next time intervals correspond to a management cycle of the memory controller.

Example 4 may include the subject matter of Example 2, and further specifies that the logic is further configured to predict, for the next time interval, a next memory imbalance state, based on a detection of the current memory imbalance state for the current time interval, wherein the identification of the critical storage units is based at least in part on the prediction of the next memory imbalance state.

Example 5 may include the subject matter of Example 4, and further specifies that the logic is further configured to predict the next memory imbalance state based at least in part a history of previous memory imbalance states.

Example 6 may include the subject matter of Example 2, and further specifies that the current memory imbalance state is further based on a numerical value defined by a variance of a number of pending access requests to each storage unit.

Example 7 may include the subject matter of Example 6, and further specifies that the current memory imbalance state is further based on a determination whether the numeric value exceeds an imbalance threshold value.

Example 8 may include the subject matter of Examples 1 to 7, and further specifies that the storage units include one of memory banks or memory partitions.

Example 9 may include the subject matter of Example 2, and further specifies that the logic is further configured to provide information associated with the identified critical storage units, to a cache memory controller, wherein the cache memory controller is configured to adjust replacement management of cached data associated with the identified critical storage units in accordance with provided information, for the next time interval.

Example 10 may include the subject matter of Example 9, and further specifies that wherein the cache memory controller is configured to adjust the replacement management of cached data by keeping the data associated with the identified critical storage units stored in the cache memory for the next time interval.

Example 11 may include the subject matter of Example 1, and further specifies that the apparatus further includes a two-level memory arrangement, a first level including the cache memory and a second level including the memory, wherein the two-level memory arrangement includes at least one of: static random access memory (SRAM)-based first level memory and DRAM-based second level memory; embedded DRAM (eDRAM)-based first level memory and DRAM-based second level memory; firmware input-output (FWIO) first level memory and phase-change second level memory, or eDRAM-based first level memory and phase-change second level memory.

Example 12 is an apparatus for cache memory management, comprising a cache memory controller configured to operate a cache memory that is configured to selectively cache data stored in different storage units of a memory, the cache memory controller including a logic configured to adjust replacement of the cached data, based at least in part on information predicting critical one or more of the storage units, wherein a critical one of the storage units is a storage unit predicted to have more access requests than other storage units in excess of a difference threshold in an upcoming time interval.

Example 13 may include the subject matter of Example 12, and further specifies that the adjustment includes keeping data stored in a critical memory unit and cached in the cache memory for at least another time interval corresponding to a management cycle of the memory.

Example 14 may include the subject matter of Example 13, and further specifies that the adjustment comprises adjusting a default least recently used replacement approach to replacing the data cached.

Example 15 may include the subject matter of Example 14, and further specifies that the adjustment of the default least recently used replacement approach includes giving a priority for replacement of portions of cached data that are not associated with any of the one or more critical storage units.

Example 16 may include the subject matter of Example 15, and further specifies that the adjustment of the default least recently used replacement approach further includes: replacing a first portion of invalid cached data that is identified as invalid; replacing a first identified portion of cached data that is not reserved for any pending operations initiated by a memory controller operating the memory and that is not associated with any of the one or more critical storage units; replacing a first identified portion of cached data that is least recently used and not reserved for any pending operations initiated by a memory controller; and replacing a first identified portion of cached data that is not reserved for any pending operations initiated by the memory controller Example 17 may include the subject matter of Examples 12 to 16, and further specifies that the logic is further configured to receive the information identifying the critical one or more of the storage units from a memory controller associated with the memory.

Example 18 is a computing device-readable storage medium having executable instructions for memory management that, in response to execution by a memory controller, cause the memory controller to: determine whether the memory enters into an imbalance state based at least in part on a difference in numbers of pending access requests to different storage units; and cause an adjustment of replacement management of a cache memory, based at least in part on a result of the determine.

Example 19 may include the subject matter of Example 18, and further specifies that the instructions further cause the memory controller to: detect, for a current time interval, a current memory imbalance state, based at least in part on a difference between a number of pending access requests to one or more storage units and a number of pending access requests to remaining storage units during the current time interval; and identify, for a next time interval, one or more critical storage units, each critical storage unit having an associated number of pending access requests during the current time interval such that the distribution of the associated pending access request caused, at least in part, the detection of the current memory imbalance state.

Example 20 may include the subject matter of Example 19, and further specifies that the current and next time intervals correspond to a memory management cycle executed by the memory controller.

Example 21 may include the subject matter of Example 19, and further specifies that the instructions further cause the memory controller to predict, for the next time interval, a next memory imbalance state, based on a detection of the current memory imbalance state for the current time interval, wherein the identification of the critical storage units is based at least in part on the prediction of the next memory imbalance state.

Example 22 may include the subject matter of Example 21, and further specifies that the instructions further cause the memory controller to predict the next memory imbalance state based at least in part on one or more previously predicted imbalance states.

Example 23 is a cache memory controller-implemented method for cache management, comprising: causing, by a cache memory controller, selective caching of data stored in different storage units of a memory; adjusting, by the cache memory controller, replacement of the cached data in an upcoming time interval, based at least in part on information predicting critical one or more of the storage units, wherein a critical one of the storage units is a storage unit predicted to have more access requests than other storage units in excess of a difference threshold in the upcoming time interval.

Example 24 may include the subject matter of Example 23, and further specifies that the storage units include banks or partitions.

Example 25 may include the subject matter of Example 23, and further specifies that the adjusting includes keeping, by the cache memory controller, data stored in a critical memory unit and cached in the cache memory for at least another time interval corresponding to a management cycle of the memory.

Example 26 may include the subject matter of Examples 23 to 25, and further specifies that the adjusting includes determining, by the memory controller, to replace portions of cached data that are not associated with any of the one or more critical storage units.

Example 27 is an apparatus for memory management, comprising: means for determining whether the memory enters into an imbalance state based at least in part on a difference in numbers of pending access requests to different storage units, and means for causing an adjustment of replacement management of a cache memory, based at least in part on a result of the determine.

Example 28 may include the subject matter of Example 27, and further specifies that the apparatus further comprises means for detecting, for a current time interval, a current memory imbalance state, based at least in part on a difference between a number of pending access requests to one or more storage units and a number of pending access requests to remaining storage units during the current time interval; and means for identifying, for a next time interval, one or more critical storage units, each critical storage unit having an associated number of pending access requests during the current time interval such that the distribution of the associated pending access request caused, at least in part, the detection of the current memory imbalance state.

Example 29 is an apparatus for cache management, comprising: means for adjusting replacement of the cached data, based at least in part on information predicting critical one or more of the storage units, wherein a critical one of the storage units is a storage unit predicted to have more access requests than other storage units in excess of a difference threshold in an upcoming time interval.

Example 30 may include the subject matter of Example 29, and further specifies that the means for adjusting includes means for keeping data stored in a critical memory unit and cached in the cache memory for at least another time interval corresponding to a management cycle of the memory.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. An apparatus comprising:
  a memory controller associated with a memory having a plurality of storage units, the memory controller including logic to determine whether the memory enters into an imbalance state based at least in part on a difference in numbers of pending access requests to different storage units, and cause an adjustment of replacement management of cached data in a cache memory, based at least in part on a result of the determination, wherein in response to the cached data includes data corresponding to an individual access request, the memory controller is to provide the requested data from the cache memory and not forward the individual access request to the memory, and wherein the adjustment of replacement management includes a delay in the replacement of at least some of the cached data.

2. The apparatus of claim 1, wherein the logic is to:
  detect, for a current time interval, a current memory imbalance state, based at least in part on a difference between a number of pending access requests to one or more storage units and a number of pending access requests to remaining storage units during the current time interval; and
  identify, for a next time interval, one or more critical storage units, each critical storage unit having an associated number of pending access requests during the current time interval such that a distribution of the associated pending access requests caused, at least in part, the detection of the current memory imbalance state.

3. The apparatus of claim 2, wherein the current and next time intervals correspond to a management cycle of the memory controller.

4. The apparatus of claim 2, wherein the logic is further to predict, for the next time interval, a next memory imbalance state, based on a detection of the current memory imbalance state for the current time interval, wherein the identification of the critical storage units is based at least in part on the prediction of the next memory imbalance state.

5. The apparatus of claim 4, wherein the logic is further to predict the next memory imbalance state based at least in part a history of previous memory imbalance states.

6. The apparatus of claim 2, wherein the current memory imbalance state is further based on a numerical value defined by a variance of a number of pending access requests to each storage unit.

7. The apparatus of claim 6, wherein the current memory imbalance state is further based on a determination of whether the numerical value exceeds an imbalance threshold value.

8. The apparatus of claim 2, wherein the logic is further to provide information associated with the identified critical storage units, to a cache memory controller, wherein the cache memory controller is to adjust replacement management of cached data associated with the identified critical storage units in accordance with provided information, for the next time interval.

9. The apparatus of claim 8, wherein the cache memory controller is to adjust the replacement management of cached data by keeping the data associated with the identified critical storage units stored in the cache memory for the next time interval.

10. The apparatus of claim 1, wherein the storage units include one of memory banks or memory partitions.

11. The apparatus of claim 1, wherein the apparatus further includes a two-level memory arrangement, a first level including the cache memory and a second level including the memory, wherein the two-level memory arrangement includes at least one of: static random access memory (SRAM)-based first level memory and DRAM-based second level memory; embedded DRAM (eDRAM)-based first level memory and DRAM-based second level memory; wide input-output (WI/O) first level memory and phase-change second level memory, or eDRAM-based first level memory and three dimensional (3D) cross point second level memory.

12. An apparatus, comprising:
  a cache memory controller to operate a cache memory to selectively cache data stored in different storage units of a memory in the cache memory, the cache memory controller including a logic to adjust replacement of the cached data in the cache memory, based at least in part on information predicting a critical state in one or more of the storage units, wherein a critical state in one of the storage units is a storage unit predicted to have more access requests than other storage units in excess of a difference threshold in an upcoming time interval.

13. The apparatus of claim 12, wherein the adjustment includes keeping data stored in a critical memory unit and cached in the cache memory for at least another time interval corresponding to a management cycle of the memory.

14. The apparatus of claim 13, wherein the adjustment comprises adjusting a default least recently used replacement approach to replacing the data cached.

15. The apparatus of claim 14, wherein the adjustment of the default least recently used replacement approach includes giving a priority for replacement of portions of cached data that are not associated with any of the one or more critical storage units.

16. The apparatus of claim 15, wherein the adjustment of the default least recently used replacement approach further includes: replacing a first portion of invalid cached data that is identified as invalid; replacing a first identified portion of cached data that is not reserved for any pending operations initiated by a memory controller operating the memory and that is not associated with any of the one or more critical storage units; replacing a first identified portion of cached data that is least recently used and not reserved for any pending operations initiated by a memory controller; and replacing a first identified portion of cached data that is not reserved for any pending operations initiated by the memory controller.

17. The apparatus of claim 12, wherein the logic is further to receive the information identifying the critical one or more of the storage units from a memory controller associated with the memory.

18. At least one non-transitory computing device-readable storage medium having executable instructions that, in response to execution by a memory controller, cause the memory controller to:
   determine whether a memory enters into an imbalance state based at least in part on a difference in numbers of pending access requests to different storage units;
   cause an adjustment of replacement management of cached data in a cache memory, based at least in part on a result of the determination; and
   provide data corresponding to an access request from the cache memory rather than the memory in response to the cached data includes the data corresponding to the access request, wherein the adjustment of replacement management includes a delay in the replacement of at least some of the cached data.

19. The computing device-readable storage medium of claim 18, wherein the instructions further cause the memory controller to:
   detect, for a current time interval, a current memory imbalance state, based at least in part on a difference between a number of pending access requests to one or more storage units and a number of pending access requests to remaining storage units during the current time interval; and
   identify, for a next time interval, one or more critical storage units, each critical storage unit having an associated number of pending access requests during the current time interval such that the distribution of the associated pending access request caused, at least in part, the detection of the current memory imbalance state.

20. The computing device-readable storage medium of claim 19, wherein the current and next time intervals correspond to a memory management cycle executed by the memory controller.

21. The computing device-readable storage medium of claim 19, wherein the instructions further cause the memory controller to predict, for the next time interval, a next memory imbalance state, based on a detection of the current memory imbalance state for the current time interval, wherein the identification of the critical storage units is based at least in part on the prediction of the next memory imbalance state.

22. The computing device-readable storage medium of claim 21, wherein the instructions further cause the memory controller to predict the next memory imbalance state based at least in part on one or more previously predicted imbalance states.

23. A memory controller-implemented method comprising:
   causing, by a memory controller, selective caching of data stored in different storage units of a memory in a cache memory; and
   adjusting, by the memory controller, replacement of the cached data in the cache memory in an upcoming time interval, based at least in part on information predicting critical state in one or more of the storage units, wherein a critical state in one of the storage units is a storage unit predicted to have more access requests than other storage units in excess of a difference threshold in the upcoming time interval.

24. The memory controller-implemented method of claim 23, wherein the adjusting includes keeping, by the memory controller, data stored in a critical memory unit and cached in the cache memory for at least another time interval corresponding to a management cycle of the memory.

25. The controller-implemented method of claim 23, wherein the adjusting includes determining, by the memory controller, to replace portions of cached data that are not associated with any of the one or more critical storage units.

* * * * *